Patented Oct. 9, 1934

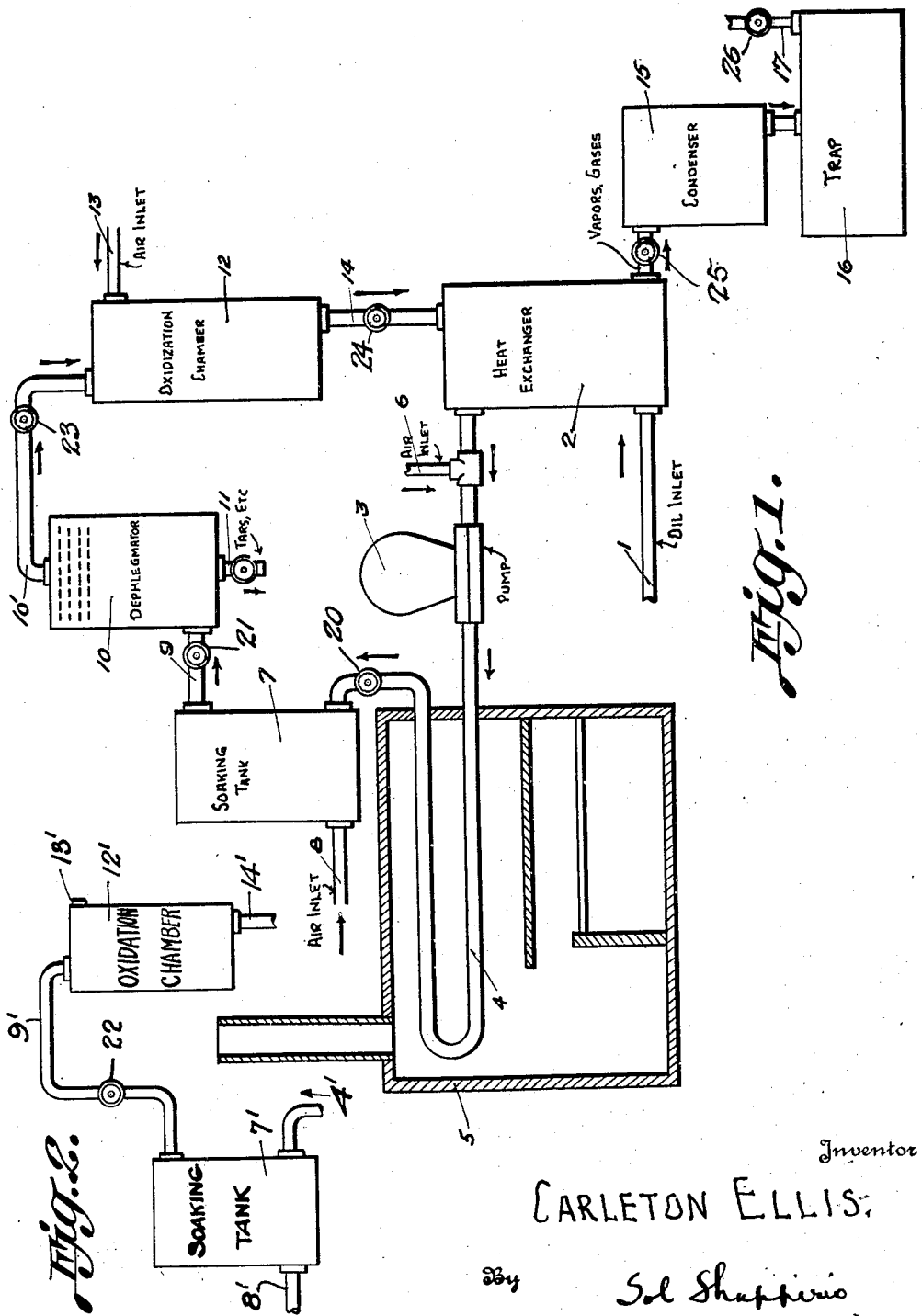

1,976,696

UNITED STATES PATENT OFFICE 1,976,696

SELF COMPENSATED MOTOR FUEL AND PROCESS OF MAKING SAME

Carleton Ellis, Montclair, N. J., assignor to Ellis-Foster Company, a corporation of New Jersey Application April 29, 1924, Serial No. 709,915
Renewed July 2, 1932

5 Claims. (Cl. 196—142)

This invention relates to a self-adjusted motor fuel containing self-made correctives of combustion disturbances and to the process of making same and relates especially to a pressure-cracked modified motor fuel having desirable characteristics.

This application is a continuation in part of my co-pending cases Serial Nos. 703,980 and 705,935. This application is also a continuation in part of application Serial Number 538,338 filed February 21, 1922.

The invention has for one object the production of a modified gasoline or gasoline-substitute relatively free from those objectionable qualities such as knocking which now interfere with the proper utilization of ordinary gasoline and which call for the addition of foreign substances as remedies; such as lead and tin ethyl compounds, iodine, or various other so-called tonics and palliatives.

According to the present invention ordinary gasoline or preferably gasoline made by a cracking operation preferably under high pressure may be caused to acquire such a constitution or composition by appropriate treatment that the addition of metal "dopes" or "tonics" is unnecessary; in other words that the composite character of gasoline affords within itself the potential material for correction of its defects without resorting to foreign substances, which in many cases doubtless are capable of producing unpleasant side reactions, poisonous effects etc.

More specifically the invention relates to a motor fuel comprising cracked gasoline containing substances causing engine-knock and thermolytically-cyclicized bodies of petroleum origin tending to minimize engine knock and oxidized bodies also of petroleum origin, the proportion of such cyclicized and oxidized bodies being predetermined for the purpose and with the result of reducing engine-knock to a considerable degree. Or stated in another way the invention concerns a self-adjusted motor fuel comprising cracked gasoline containing heavy ends productive of engine-knock and including an influential proportion of petroleum-generated thermolytically-cyclicized bodies and oxygen-containing compounds of petroleum origin; said bodies and compounds being proportioned in a predetermined manner for the purpose and with the result of minimizing engine knock. The invention also embraces the process of producing a self-adjusted motor fuel comprising cracked gasoline containing heavy ends productive of engine-knock and including an influential proportion of petroleum-generated thermolytically-cyclicized bodies and oxygen-containing compounds of petroleum origin; said bodies and compounds being proportioned in a predetermined manner for the purpose and with the result of minimizing engine knock to a considerable degree, said fuel preferably having a boiling range from about 130° F. to 450° F.

The drawing illustrates diagrammatically in Figure 1, a form of plant that may be used in connection with this invention; and in Figure 2 a fragmentary portion of this plant showing a modification thereof.

An oil which is considerably heavier than gasoline as for example gas oil is warmed or preheated by means of a heat exchanger and the preheated oil is passed by means of a force pump into and through a long coil of pipe placed over a strong fire so that the oil in passing through the coil will be heated to a temperature of say between 700 and 900° F., a temperature of 800° F. being satisfactory. The oil discharges from the coil into a soaking tank preferably situated above the coil so that the heat from the fire which is unabsorbed by the coil will supply additional heat to the soaking tank. The apparatus is maintained under a pressure preferably of between 250 and 350 pounds above atmospheric pressure. If desired also a small proportion of air may be admitted with the oil at the force pump or air may be forced into the soaking tank to bring about a partial or initial oxidation. This serves to raise the temperature more rapidly, helps to build up an initial pressure and has a beneficial action in some cases on oils containing sulphur. The strong heating in the coil and the further digestion of the oil in the soaking tank under pressure results in a high yield of gasoline and kerosene.

The vapors or cracked distillation products coming from the soaking tank or other cracking apparatus preferably are oxidized soon after withdrawal from such cracking apparatus while the vapors are still hot enough to react readily with air or oxygen either with or without the aid of catalytic material. By utilizing the gases at a temperature approaching that employed in the cracking step it does not become necessary to employ special heating devices and to use additional fuel for the purpose. The reaction with the air or oxygen or other oxidizing gas is exothermic and heat is therefore developed which may be utilized by passing the vapors through a heat-exchanger wherein raw oil for cracking is warmed or preheated and thereby put in readiness for introduction into the heating coil forming a part of the cracking apparatus.

In some cases it may be desired to remove the heavier portions, tars and the like prior to oxidation and for this purpose a dephlegmator may be situated intermediate the soaking tank and the oxidizing chamber or flues. The removal of some of the heavier or tarry material may be advantageous when a catalyzer is employed in the oxidizing step.

The oxidation may be carried out by simply admitting air at one or more points in a flue or chamber through which the vaporized distillate is passing; the temperature at this point being such that a substantial utilization of the oxygen takes place. Preferably the air is admitted at a plurality of points along such flue or conduit. In this conduit there may be situated a bed of catalytic material such as fragments of iron coated with vanadium oxide, granular aluminum coated with a mixture of molybdenum and vanadium oxide or other appropriate catalytic material preferably in a loose granular form, allowing the vapors and gases to pass through readily. In other cases metallic gauze, wire or balls, fragments of pumice, quartz, fire brick or other refractory material may be placed in the oxidizing flue or flues. The latter preferably are set vertically with the vapor and gas mixture passing downward therethrough and being drawn off at the bottom to condensers. The condensation may take place at atmospheric pressure if desired although preferably such condensation is carried out at pressures above atmospheric. Between the oxidizing flues or chamber and the condensers there may be placed dephlegmators or heat-exchangers as desired. The dephlegmators may discharge their heavy portion back into the cracking apparatus. A battery of cracking apparatus with a centralized oxidizing chamber may be used in some cases especially when the arrangement is such that the drop in temperature is not prejudicial.

The cracking apparatus preferably as noted is intended to operate under a pressure of from 250 to 350 pounds above atmospheric pressure. In general I prefer as stated in Serial 523,208 now U. S. Patent 1,516,720, to use a pressure of at least 10 atmospheres and preferably between 10 or 20 atmospheres or higher according to conditions.

In some cases the steps both of cracking and oxidizing may be carried out in the vapor phase at atmospheric pressure or at pressures above atmospheric for example at four or five atmospheres. Another modification is that of causing the cracking to take place at atmospheric pressure and oxidation to progress at a higher pressure. Again the procedure may be carried out in a reverse way, that is cracking is effected at a pressure above atmospheric and oxidation is conducted at atmospheric pressure. By conducting as separate steps the operation of cracking and that of oxidizing it is possible to have differential pressures best adapted for the particular operation in hand.

Pressures below atmospheric are not precluded in either step but are not recommended.

When cracking and condensation are together carried out under approximately the same pressure e. g. three or four atmospheres above atmospheric pressure the oxidation phase may be conducted at any point in the condenser line at such a distance from the cracking coil, tank or still that a suitable temperature exists which may tend to direct the reaction toward the particular type of oxidation or mixed oxidation desired. For example there may be various reactions such as those of hydroxylation, formation of ethylene oxide and higher oxides, aldehydes, aliphatic and aromatic acids, ketones, keto-aldehydes, keto-acids, keto-alcohols, aldehyde-acids, aldehyde-alcohols, alcohol acids etc. In so complicated a mixture as that of cracked oil it is of course not possible to provide conditions which will produce any one compound or restricted type of compounds exclusively but conditions may be directed to yield an influential amount of a specified compound or group of related compounds in some cases.

When cracking takes place under considerable pressure and condensation is at a substantially lower pressure or is in the neighborhood of atmospheric pressure the oxidizing chamber may be under the pressure exerted in the still or cracking chamber or it may be under the pressure of the condenser line. Or two or more oxidizing chambers may be used in series, one or more being operated at approximately still pressure and others being at about condenser pressure.

In this way separate or differential oxidations may take place under different temperatures and pressures. This may become a matter of importance in the treatment of a complex mixture of saturated and unsaturated hydrocarbons, aromatic, naphthenic and paraffin bodies and other complex substances which may be present in the cracked material.

Thus oxidation may take place at one or more places after the oil has been cracked. In addition there may be as noted a certain amount of oxidation provided in the heating coil of the cracking apparatus or in the soaking tank. Oxygen may be admitted at any or all of these points. Preferably however I prefer to carry out the oxidation in the vapors themselves and therefore preferably after leaving the soaking tank because at this stage the temperature of oxidation is under better control. In the heating coil and soaking tank the temperature necessarily must be that required to produce cracked gasoline by which term I mean gasoline produced by the cracking operation. The temperature must favor cracking and not necessarily oxidation. By carrying out the oxidation as a separate step the temperature can be adjusted to bring about the most efficient conditions of oxidation to produce intermediate products assisting in the adjustment of the motor fuel to render the highest and most effective development of power when employed in an internal combustion engine.

The temperature at which the oxidation is carried out in the case of the cracked vapors is preferably above 250° F. and preferably not in excess of 600° F. A fairly vigorous oxidation may be obtained between the range 400° F. and 600° F. A temperature of incipient redness is suitable in some cases. In other cases I prefer to use a temperature which is below that of redness but is at a black heat at which oxidation progresses effectively without the formation of any excessive amount of ultimate products of combustion. Such procedure has been indicated in Serial 284,372 now U. S. Patent 1,697,267.

Thus by proceeding in this manner oxidation may be carried out at a temperature independent of the cracking temperature. A more gentle oxidation may be carried out at temperatures below 400° F. Under these circumstances a special orientation of oxidation may be effected. Temperatures between 250° F. and 400° F. may be employed when the object primarily is that of yielding motor fuels of reduced smoke-forming tendencies and a lower carbonizing effect on engine cylinders.

In this connection it may be noted that those bodies which produce smoky flames or are recognized in the gas industry as "illuminants" including the ethylenes and other substances oxidize with relative ease. These may be converted by gentle oxidation to partial or intermediate combustion products and a diminution in carbon deposition in engine cylinders may be expected when the fuel is employed for the generation of power by means of internal combustion engines.

When a mild or moderate oxidation is carried out at say temperatures whose lower range is 350° F. or 375° F. and whose upper range is preferably not in excess of 450° F. or 475° F. that is a spread of approximately 100° whose upper limit preferably does not exceed that mentioned, it is generally desirable to avoid exposing the oxidized material to higher temperatures for the reason that reactions may take place which would be prejudicial for the purpose in hand. Thus a reaction between oxidized material and a hydrocarbon could take place as follows:

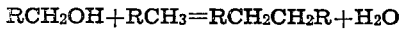

$$RCH_2OH + RCH_3 = RCH_2CH_2R + H_2O$$

The products of such a reaction might be useful for some purposes but for producing a motor fuel having reduced knocking and carbonizing tendencies combustible oxygen-containing volatile substances are desired and a reaction of this type may tend to negative such an objective. Hence when initiating mild oxidation at a temperature near or below 475° or 480° F. only I prefer either to hold the temperature throughout the oxidation stage as near the established point as possible or even slightly lower the temperature as oxygen compounds accumulate in the zone of reaction.

If the heat development in the oxidizing flues becomes too great the temperature may be reduced by cooling coils and the excess heat may be employed to advantage in preheating the raw oil.

The rate and character of oxidation is modified by pressure. Combustion under pressure is more vigorous and therefore requires more adequate control. Partial combustion giving intermediate products of mild oxidation may at ordinary atmospheric pressure develop so little heat as to fail to be self-sustaining while at a pressure of several atmospheres self-sustaining heat conditions may result or the heat development may become excessive and call for cooling.

The oxidation of petroleum oil and especially cracked material containing "illuminants" under superatmospheric pressure for example a pressure say of three or four atmospheres above atmospheric, on the one hand, up to ten or twenty atmospheres or even higher pressures is a feature included within the preferred form of the invention.

Another feature of importance is that of admitting air or oxygen in such quantities and under such conditions that explosive mixtures are not produced. An excess of air in such an amount to cause explosions should not be employed and preferably only a comparatively small proportion of the cracked gasoline vapors need to be oxidized in order to obtain a fuel of the desired qualities. Thus while the whole body of vapors from the soaking tank, other than that portion which has been removed by dephlegmation, may be passed through the oxidizing zone with a moderate amount of air preferably introduced at a series of places to avoid any localized combustion and explosion, only a small amount of such vapors, say 5 or 10 per cent need to be actually oxidized and if the conditions are such that the air is admitted in a uniform and well-distributed manner the combustion of the more sensitive or more easily oxidized substances present may take place resulting in a more stable form of motor fuel. It is well known that cracked gasoline contains various substances which may be of the acetylene type or conjugated diolefins or bodies possibly of the nature of cyclodienes which resinify easily and such gum formation occurring in the finished gasoline gives rise to trouble. In one form of my invention it is an object to carry out the oxidation in so-well-regulated a manner that these sensitive bodies may become oxidized and instead of detracting from the quality of the fuel by forming gummy deposits therein at some subsequent time I propose to utilize these bodies in an oxidized form to assist in reducing engine knock and to diminish the tendency to formation of carbon deposits in the engine cylinders.

The crude motor fuel collected by condensation may contain too large an amount of heavy ends that is kerosene and other bodies and preferably is submitted to distillation to obtain an oxidized naphtha boiling from say 100° F to 450° F. Another boiling range is between 130° F.–440° F. It is one object of the present invention to employ a somewhat higher proportion of heavier ends, that is kerosene or oxidized kerosene than is feasible in a motor fuel which is not of the self-adjusted type. Hence I may in some cases employ a boiling range which extends up to 500° F. or thereabouts. The initial boiling point may vary considerably depending upon whether the motor fuel is to be used in summer or winter weather, lighter boiling constituents being desired in the latter case. In any case the boiling range preferably should not extend above 500° F. In the summer season a motor fuel containing a larger proportion of oxidized kerosene, say up to 30 per cent or so may be employed while in the winter season a lesser amount of kerosene is desirable. During the winter season the consumption of kerosene for other purposes is greater hence adjustment made in this manner is quite feasible from a commercial standpoint.

The crude oxidized naptha obtained in this manner may be used without refining in some cases or it may be treated with concentrated or diluted sulphuric acid followed by caustic soda treatment and if desired by the "doctor" treatment. Hypochlorous acid or hypochlorites may be used for refining in some cases.

From the foregoing it will be noted that the oxidation of the vapors is not limited to a catalytic process. The process of the present invention also comprises cracking a heavy oil such as gas oil under a pressure of at least 10 atmospheres above atmospheric pressure and admixing some portion at least of the products of cracking, prior to cooling below a reactive temperature, with air insufficient in amount to form an explosive mixture. In one form of the invention such mixture is brought into contact with catalytic material.

For oxidation the supply of oxygen may be air or air which has been enriched with oxygen, or substantially pure oxygen may be employed. Oxygen may be derived by the liquefaction of air and the nitrogen separated may be employed to make synthetic ammonia by catalytic combination with hydrogen derived from still gases in the manner recited in certain of my copending applications.

When air is directly employed for oxidation, or when a mixture of air and stack gases is used the uncondensed gases liberated from the condensers may be superheated or cracked at a high temperature to obtain an impure mixture of nitrogen and hydrogen which may be purified and employed in making synthetic ammonia.

Furthermore it may be noted that the reactions resulting from adding cold air to very hot cracked vapors may be quite different from those occurring when the vapors at a lower temperature are mixed with preheated air; the latter for example being admitted at the same temperature as the vapors. Thus the treatment of the vapors as they come from the cracking still at a temperature say of 700° F. with air at room temperature would theoretically on the basis of sensible heat and excluding any combustion give a certain temperature average and is not likely to afford the same type of reaction as would be obtained by mixing preheated air with vapors having the same temperature as that theoretically obtained by the above mixture. Hence there are several variables the control of which require considerable attention in the orientation of desired reactions.

There may be circumstances furthermore when cracked gasoline which has been condensed without oxidation may have to be vaporized and oxidized in accordance with the foregoing. Purification to remove sulphur may be carried out prior to oxidation if in the oxidation step a catalyst is used which is poisoned by sulphur.

According to the foregoing it will be observed that I specify cracking as a separate step in order to have oxidation carried out under controllable conditions independent of those required in cracking. It should be understood however that it is possible that some cracking may go on at the temperature maintained in the oxidation zone when oxidation is carried out in the vapor phase as a step separate from that of cracking. The degree of cracking ordinarily is of an incidental character as the period of exposure to oxidizing conditions outside of the cracking still is normally brief in comparison with the period of treatment given to the oil in the cracking step proper. Thus while the treatment of a charge of oil to crack it may require a considerable number of hours the vapors leaving the cracking still may pass through an oxidizing zone wherein they are exposed to the action of an oxygen-containing gas for a period of only a few seconds or a few minutes. The action of oxidation generally speaking is considerably accelerated and to some extent oriented by the use of catalyzers.

The foregoing procedure of cracking under pressure and oxidizing results in modifying the resulting motor fuel by supplying cyclic bodies such as benzol and other aromatic hydrocarbons and various other cyclic substances and oxidized products thereby affording a self-adjustment of the composition of the motor fuel to supply correctives of combustion disturbances in the operation of internal combustion engines.

I may add that should it be desired to carry out oxidation of the vapors at a stage in the operation where the temperature has been reduced below that at which oxidation readily occurs my invention does not preclude the heating of the product which is to undergo oxidation to a temperature sufficient to put this into effect. In some cases it may be necessary or desirable to preheat the air or other oxidizing gas employed to supply oxygen for the oxidizing step.

In the apparatus illustrated diagrammatically in Figure 1, for carrying out the invention, there is shown on oil inlet 1 from which oil is fed to a heat exchanger 2, where it may be pre-heated prior to its entry to the heating coil. A pump 3 may be used to force the oil through the heating coil 4, the heating coil being heated by a furnace 5 to the desired temperature. An air inlet 6 may be used for injecting air into the preheated oil. From the heating coil 4 the oil passes to a soaking tank 7, into which air may be injected through the air inlet pipe 8. A valve 20 in the pipe 4 may be used to control the passage of the oil from the oil 4 into the soaking tank 7. From the soaking tank the vapors and gases pass through a pipe 9 having a control valve 21, to a dephlegmator 10, in which tars and heavy matter may be removed as through the draw-off line 11. From the dephlegmator or other separator, the vapors and gases pass from the upper portion of the dephlegmator through conduit 10' controlled by valve 23, to the oxidation chamber 12. An air inlet pipe 13 serves to admit air to the oxidation chamber. From the latter, the oxidation material passes through pipe 14 controlled by valve 24, to the heat exchanger 2, where these vapors and gases, etc. serve to preheat the incoming oil. From the heat exchanger the oxidation products pass to a condenser 15, a valve control 25 serving to control the passage of the oxidation products into the condenser 15. Condensed material is collected in a trap or collector 16, any residual products passing from the collector 16 by pipe 17, controlled by valve 26.

Figure 2 illustrates a portion of this plant when the separation of heavier material is not made, the vapors and gases passing directly from the soaking tank through pipe 9' to the oxidation chamber. In this form of apparatus, the oil from the pipe 4' passes into the soaking tank 7', an air inlet 8' serving to admit air to the soaking tank. From the soaking tank, the vapors and gases pass through the pipe 9' controlled by valve 22, to the oxidation chamber 12' provided with an air inlet pipe 13', and an outlet 14' for the oxidation material.

Valves 20, 21, 22, 23, 24, 25, and 26 shown on the drawing, enable the pressures and temperatures maintained in particular portions of the apparatus to be controlled.

What I claim is:—

1. A cracked motor spirit of petroleum origin comprising products of gentle oxidation between 250° F. and 475° F.

2. The process which comprises cracking petroleum oil under a pressure above atmospheric, conveying a portion at least of the cracked products under pressure through an oxidizing zone, admitting air in regulated amount to said oxidizing zone and maintaining the temperature below 475° F. but above 250° F.

3. The process which comprises cracking petroleum oil under a pressure above atmospheric, conveying a portion at least of the cracked products under pressure substantially in excess of 10 atmospheres through an oxidizing zone, admitting air in regulated amount to said oxidizing zone and maintaining the temperature below 475° F. but above 250° F.

4. The process which comprises cracking petroleum oil under a pressure above atmospheric, conveying a portion at least of the cracked products under pressure of 250-350 pounds through an oxidizing zone, admitting air in regulated amount to said oxidizing zone and maintaining the temperature below 475° F. but above 250° F.

5. The process which comprises cracking petroleum oil under a pressure above atmospheric, conveying a portion at least of the cracked products under pressure through an oxidizing zone, admitting oxygen in regulated amount to said oxidizing zone and maintaining the temperature below 475° F. but above 250° F.

CARLETON ELLIS.